June 10, 1952     G. T. HUXFORD     2,599,638
TRAILER HITCH
Filed Nov. 28, 1949
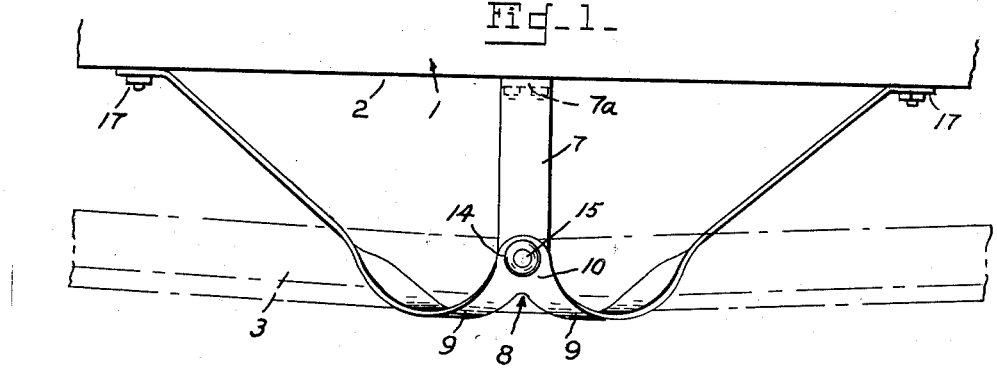
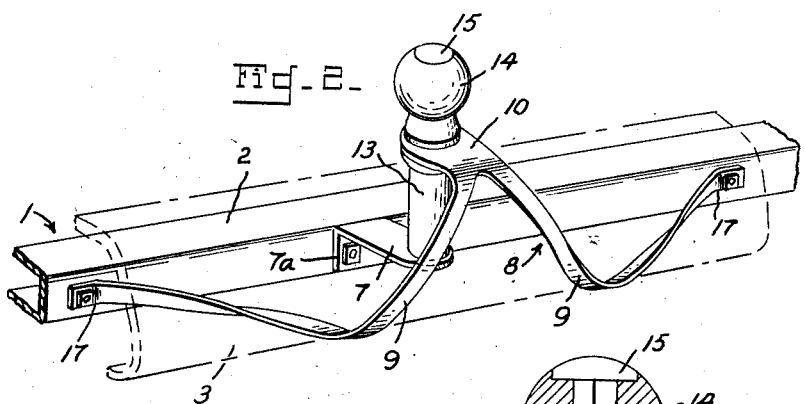
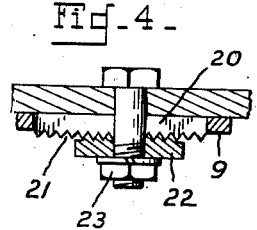
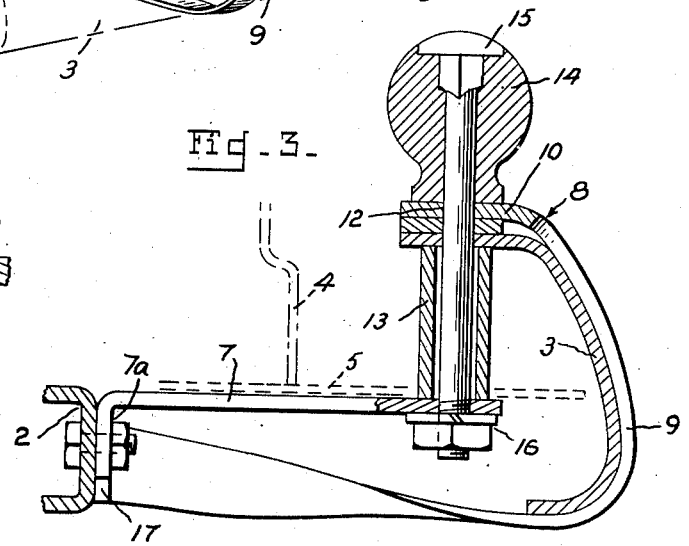
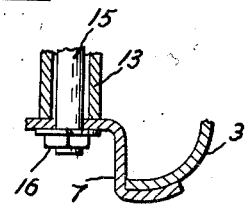
INVENTOR
George T. Huxford,
ATTORNEY Patented June 10, 1952

2,599,638

UNITED STATES PATENT OFFICE 2,599,638

TRAILER HITCH

George T. Huxford, Southington, Conn.

Application November 28, 1949, Serial No. 129,833

7 Claims. (Cl. 280—33.44)

This invention relates to improvements in means for securely supporting the bolt of a trailer hitch to a car.

One of the prime objects of this invention is to provide positive means for supporting and securing the bolt of a trailer hitch in front of the rear bumper, suitably spaced from the automobile trunk a sufficient distance to avoid interference with the opening and closing of the trunk door, and to avoid any part of the bolt supporting means projecting beyond the rear bumper.

A further object of the invention is to provide a three-point connection between the hitch bolt, bumper and the rear of the chassis, to insure an effective support and brace for the hitch when in use.

Another object of the invention is to conjunctively tie in the hitch bolt with the rear bumper by a three-point connection with the chassis.

Another and most important object of this invention is to provide what may be termed a semi-helical or twisted V-shape frame, the two arms of the frame being secured at their junction by the hitch bolt, and then wrapped around and under the bumper, with the ends of the arms securely fastened to the rear end of the chassis, the hitch bolt finding a support on the chassis mid-way between the terminals of the arms of the frame.

By providing this type of support for the hitch bolt, the pull and strain, when a trailer is coupled to a car, will be effectively distributed to the bumper, bolt and chassis. In other words, by the improved construction, the bumper is confined between the hitch bolt and the arms of the semi-helical V-shape frame and the connections with the chassis, and therefore, a substantial support for the hitch bolt is provided.

The construction and arrangement of parts and their purpose present many advantages. For instance, the improvement can be quickly and conveniently attached to a vehicle, and when so attached, no objectionable parts project beyond the rear bumper, a vitally important feature.

Other advantages will be hereinafter described and particularly pointed out in the claims.

In the accompanying drawings:

Figure 1 is a plan view of the hitch bolt support, the rear end of an automobile being shown in dotted line.

Figure 2 is a perspective view of the semi-helical or twisted V-frame for supporting the hitch bolt.

Figure 3 is a central vertical section of the hitch bolt support.

Figure 4 is a detail section of a slight modification.

Figure 5 is a detail section showing the central support extended under the bumper.

In the drawings, 1 indicates a chassis, 2 the rear bar thereof, 3 the rear bumper, 4 the rear end of the body or trunk door, and 5 the usual sand guard between the trunk and the rear bumper.

A centrally disposed bracket 7 is bolted at 7a to the rear bar 2 and extends rearwardly under the sand guard and terminates short of the front of the rear bumper, or it may be extended to fit under the bumper, as shown in Figure 5.

A semi-helical V-shape frame 8 is formed with two spreading arms 9—9 which come together at their upper forward end, as at 10. The arms meet at their upper ends and extend over the top of and beyond the bumper 3, where an opening 12 is formed. Between the upper end of the frame 8 and the bracket 7 is a sleeve 13, and on top of the end 10 is a spherical head 14 or such other type of trailer joint as may be desired. A hitch bolt 15 extends from the spherical head 14 through the upper end 10 of the frame, the sleeve 13, and bracket 7, and is terminally provided with a nut 16. This arrangement effectually binds the frame 8, bracket 7, and bumper 3 together, just in advance of the center of the bumper and behind the trunk.

The semi-helical arms of the frame 8 are flat in cross section and are wrapped around and extend below the rear bumper, and thence flare outwardly and toward the rear bar 2 of the chassis, where they are bent outwardly to fit up against the bar near the sides of the chassis and bolted, as shown at 11. The frame arms 9, when fastened to the chassis with the centrally disposed bracket 7, form a three-point suspension or support for the bolt 15, at the same time the bumper is so tied in with the construction as to form a part of the support.

By the construction described, there are no objectionable projections of parts beyond the rear bumper, and yet the arrangement is such that the bolt is positively secured in position and supported, and by reason of the semi-helical or twisted V-shape of the frame, with its arms wrapped around the bumper, the pull, strain and sudden shocks when the hitch is in use, are effectively transmitted from the bolt, bumper and brackets to the chassis.

Because of the shape of the semi-helical or twisted V-shape frame, with the arms wrapped around the bumper, the strain and support are spread over the major portion of the bumper, which distributes the pull on the trailer hitch bolt amongst all of the individual bolts attaching hitch and bumper to the chassis.

While I have specifically described the semi-helical V-shape frame as a separate element, it is evident it may be formed in two pieces brought together and secured at their over-wrapped ends, as may be found desirable.

While the arms are shown and described as flat in cross section and secured in position in a specific manner, it is evident the shape and means for securing the frame may vary. For instance, the arms may be round in cross section and twisted around the bolt. Then again, in lieu of the frame, arms, chains or wires could be substituted, and other convenient means employed to fasten the frame to the chassis.

I have described the ball as projecting above the bumper and the nut below, but I may arrange the ball at the bottom, and invert, if desired, either the ball portion or the arms of the frame only, without inverting the other.

The invention is in no way limited to use on the rear of a vehicle. It can with convenience be mounted on the front of a vehicle and used for application of a tow rope. In this instance, the frame would be attached to the front bumper.

For convenience, in attaching the parts to a car, I may make the bracket 7 and the arms 9—9, each or any, in two parts to render them adjustable to fit various cars.

For instance, the ends of the arms 9—9 or the end of the central bracket can be slotted, as at 20, and the surface surrounding the slot serrated, as at 21. Then a serrated washer 22 can be fitted over the serrated surface of the adjacent part and a bolt 23 applied.

What I claim is:

1. Means for securing a hitch bolt to a vehicle, comprising a bolt, a central bracket to be attached to the end of a vehicle beyond the bolt, and on which the bolt is mounted, a frame having a pair of oppositely disposed semi-helical arms mounted on the bolt to embrace the outer surface of a bumper of a vehicle, said arms extending beyond and outwardly from the bolt, means for securing the bracket to the chassis of a vehicle, and means for securing the free ends of the arms of the frame to the chassis of a vehicle.

2. Means for securing a hitch bolt to a vehicle, as defined in claim 1, wherein the frame arms are flat in cross section to embrace the outer surface of a bumper and their free ends flare outwardly and beyond the bolt.

3. In combination, a chassis, a bumper, a centrally disposed bracket, means for connecting the centrally disposed bracket to the chassis, a bolt secured to the outer end of the centrally disposed bracket, a frame centrally secured to the bolt in advance of the bumper, said frame having semi-helical arms wrapped around the rear outer surface of the bumper, said arms extending beyond and outwardly from the bumper with their free ends against the chassis, and means for securing the free ends of the arms of the frame to the chassis.

4. Means for securing a hitch bolt to a vehicle, comprising a pair of semi-helical arms to wrap around the outer surface of the bumper of a vehicle said arms extending beyond and outwardly from the bolt, means associated with the bolt to secure said bolt to the chassis of a vehicle, and means at the free outwardly extended ends of the semi-helical arms for securing same to a vehicle.

5. In combination, means for securing a hitch bolt to a vehicle having a chassis, a trunk and a rear bumper, said means comprising a centrally disposed bracket having means to attach it to the chassis, a bolt supported at the rear end of the bracket and between the rear bumper and the trunk of the vehicle, a frame centrally supported on the bolt and having a pair of semi-helical arms extending over and wrapped around the rear of and below the bumper and extending forwardly and outwardly to the chassis, and means at the terminals of the arms for attaching the arms to the chassis.

6. Means for securing a hitch bolt to a vehicle, comprising a bolt, a central bracket to which the bolt is secured, a frame having a pair of oppositely disposed semi-helical arms mounted on the bolt to embrace the outer surface of a bumper of a vehicle, and means for securing the bracket and arms of the frame to the chassis of a vehicle.

7. In combination, means for securing a hitch bolt to a vehicle having a chassis and a bumper, said means comprising a centrally disposed bracket having means to attach it to the chassis, a bolt supported at the rear end of the bracket and the rear bumper, a frame centrally supported on the bolt and having a pair of semi-helical arms extending over and wrapped around the rear of and below the bumper and extending forwardly and outwardly to the chassis, and means at the terminals of the arms for attaching the arms to the chassis of the vehicle.

GEORGE T. HUXFORD.

REFERENCES CITED

The following references are of record in the file of this patent:

UNITED STATES PATENTS

| Number | Name | Date |
| --- | --- | --- |
| 2,090,857 | White | Aug. 24, 1937 |
| 2,097,006 | Weis | Oct. 26, 1937 |